United States Patent
Tiilikainen et al.

(10) Patent No.: US 9,655,448 B2
(45) Date of Patent: May 23, 2017

(54) SHELF FOR ROLL CONTAINER, A ROLL CONTAINER CONTAINING SUCH A SHELF AND A METHOD OF RETROFITTING SUCH A SHELF TO A ROLL CONTAINER

(71) Applicant: K. Hartwall Oy Ab, Söderkulla (FI)

(72) Inventors: Markku Tiilikainen, Söderkulla (FI); Jussi Raninen, Söderkulla (FI)

(73) Assignee: K. Hartwall Oy Ab, Soderkulla (FI)

( * ) Notice: Subject to any disclaimer, the term of this patent is extended or adjusted under 35 U.S.C. 154(b) by 0 days.

(21) Appl. No.: 14/890,140

(22) PCT Filed: Apr. 29, 2014

(86) PCT No.: PCT/FI2014/050312
§ 371 (c)(1),
(2) Date: Nov. 9, 2015

(87) PCT Pub. No.: WO2014/181032
PCT Pub. Date: Nov. 13, 2014

(65) Prior Publication Data
US 2016/0081475 A1    Mar. 24, 2016

(30) Foreign Application Priority Data

May 8, 2013    (EP) .................................. 13166935

(51) Int. Cl.
*A47B 96/02* (2006.01)
*B62B 3/00* (2006.01)
*A47B 47/02* (2006.01)

(52) U.S. Cl.
CPC .......... *A47B 96/024* (2013.01); *A47B 47/025* (2013.01); *B62B 3/005* (2013.01); *B62B 2205/33* (2013.01)

(58) Field of Classification Search
CPC ..... A47B 96/024; A47B 96/02; A47B 96/025; A47B 47/024; A47B 47/025; B62B 3/005; B62B 2205/33
(Continued)

(56) References Cited

U.S. PATENT DOCUMENTS

| 2,992,742 | A | | 7/1961 | Pendergrast, Jr. |
| 3,746,358 | A | * | 7/1973 | Swick, Jr. ................ B62B 3/02 280/651 |

(Continued)

FOREIGN PATENT DOCUMENTS

| EP | 0326767 A1 | 8/1989 |
| EP | 1833715 A1 | 9/2007 |
| GB | 2205482 A | 12/1988 |

OTHER PUBLICATIONS

K. Hartwall; K. Hartwall SmartShelf (adjustable metal shelf for Roll Container); single page data sheet; Oct. 21, 2013; retrieved from the Internet: URL:http://www.k-hartwall.com/media/19769/K-Hartwall-SmartShelf_data-sheet-cv-website.pdf; Söderkulla, Finland.

*Primary Examiner* — Korie H Chan
(74) *Attorney, Agent, or Firm* — Chernoff, Vilhauer, McClung & Stenzel, LLP (57) ABSTRACT

An accessory shelf for a roll container. The shelf includes a pivoting mechanism provided to the first end of the shelf for pivoting the shelf relative to to a frame profile of a first wall of the roll container between a horizontal load carrying configuration and a vertical folding configuration. Included in the shelf is a locking mechanism provided to the second end of the shelf to rest the shelf in a load carrying orientation against a second wall of the roll container. The locking mechanism is configured to engage a horizontal element of the first wall to suspend the shelf from the horizontal element when the shelf is in the vertical folding configura- (Continued)

tion. The pivoting mechanism includes two slide members that oppose each other at the first end and are shaped to at least partly envelop a vertical section of a frame profile of the first wall of the roll container to slide along corresponding opposing vertical sections of the frame profile The pivoting mechanism also includes an axle connected to at least one slide member extending towards the other hinge member to create an axis of revolution for the shelf. The pivoting mechanism further includes a limiter connected to the axle and rotatable about the axis of revolution relative to at least one slide member and to engage with a horizontal element of the first wall.

20 Claims, 9 Drawing Sheets

(58) Field of Classification Search
USPC .......................................................... 211/150
See application file for complete search history.

(56) References Cited

U.S. PATENT DOCUMENTS

| | | | |
|---|---|---|---|
| 3,840,242 A * | 10/1974 | Craig, Sr. | B62B 3/186 |
| | | | 280/33.996 |
| 3,908,562 A * | 9/1975 | Wittschen | A47F 5/135 |
| | | | 108/163 |
| 3,971,568 A * | 7/1976 | Wright | B62B 3/184 |
| | | | 280/33.996 |
| 4,159,831 A | 7/1979 | Schorr | |
| D409,811 S * | 5/1999 | Hutchinson | D34/17 |
| 7,213,816 B2 * | 5/2007 | Gregory | B62B 3/106 |
| | | | 280/33.996 |
| 2014/0110447 A1 * | 4/2014 | Hilley | B62B 5/00 |
| | | | 224/401 |

* cited by examiner

SHELF FOR ROLL CONTAINER, A ROLL CONTAINER CONTAINING SUCH A SHELF AND A METHOD OF RETROFITTING SUCH A SHELF TO A ROLL CONTAINER

FIELD OF THE INVENTION

The present invention relates to logistics equipment, namely to load carriers. In particular, the invention relates to retrofit accessories for nestable roll containers.

BACKGROUND ART

Roll containers are used for various tasks ranging from transporting only one large piece. e.g. a painting, to transporting a large number of small items, e.g. letters. For the purpose of transporting large items it is quite common to order a new roll container without any accessories, whereby the roll container only contains a chassis, castors and two fixed walls. For the purpose of collecting small items, however, a new roll container is typically ordered with a shelf for dividing the inner volume of the roll container, which not only improves occupational safety but also protects the collected items in the bottom section of the container from the weight of stacked items in the same batch.

FIGS. 1 to 5 illustrate one example of such an accessory shelf (200) which is designed to be installed between the opposing side walls (110, 120) of a roll container during the manufacture of the roll container (100). The first end (210) of the shelf (200) is pivoted to the frame profile (111) of the first wall (110) via a hinge (211) which is locked to the profile (111) by means of screws (cf. FIG. 2). The first end (210) also has a support (212) which limits the vertical movement of the shelf (200) by engaging with a horizontal wire (113) of the mesh of the first wall (110) from below. The opposing end (220). i.e. the second end, of the shelf (200) has downward extending and curved protrusions (222) for further limiting the angular position of the shelf (200) to the horizontal position by engaging with a horizontal wire (123) of the mesh of the second wall (120) from above (cf. FIGS. 3 and 5). The second end (220) of the shelf (200) also has an upwardly extending straight protrusion (221) which is used for locking the shelf (200) to a vertical folded position in which the protrusion (221) engages with a specially designed angular wire in the mesh of the first wall (110) (cf. FIG. 4).

The average life span of a roll container is about 10 years. During its expected life span, the roll container may be used for new tasks which require features which were not installed in the original configuration of the roll container. One example would be a roll container which was originally intended to be used for transporting a small number of large items within a factory and which is subsequently used for collecting a large number of smaller items for shipping outside the factory. Should the purpose of the roll container change to the collection of smaller items, it is necessary to install a retrofit shelf for dividing the inner volume of the roll container.

Figure 1:
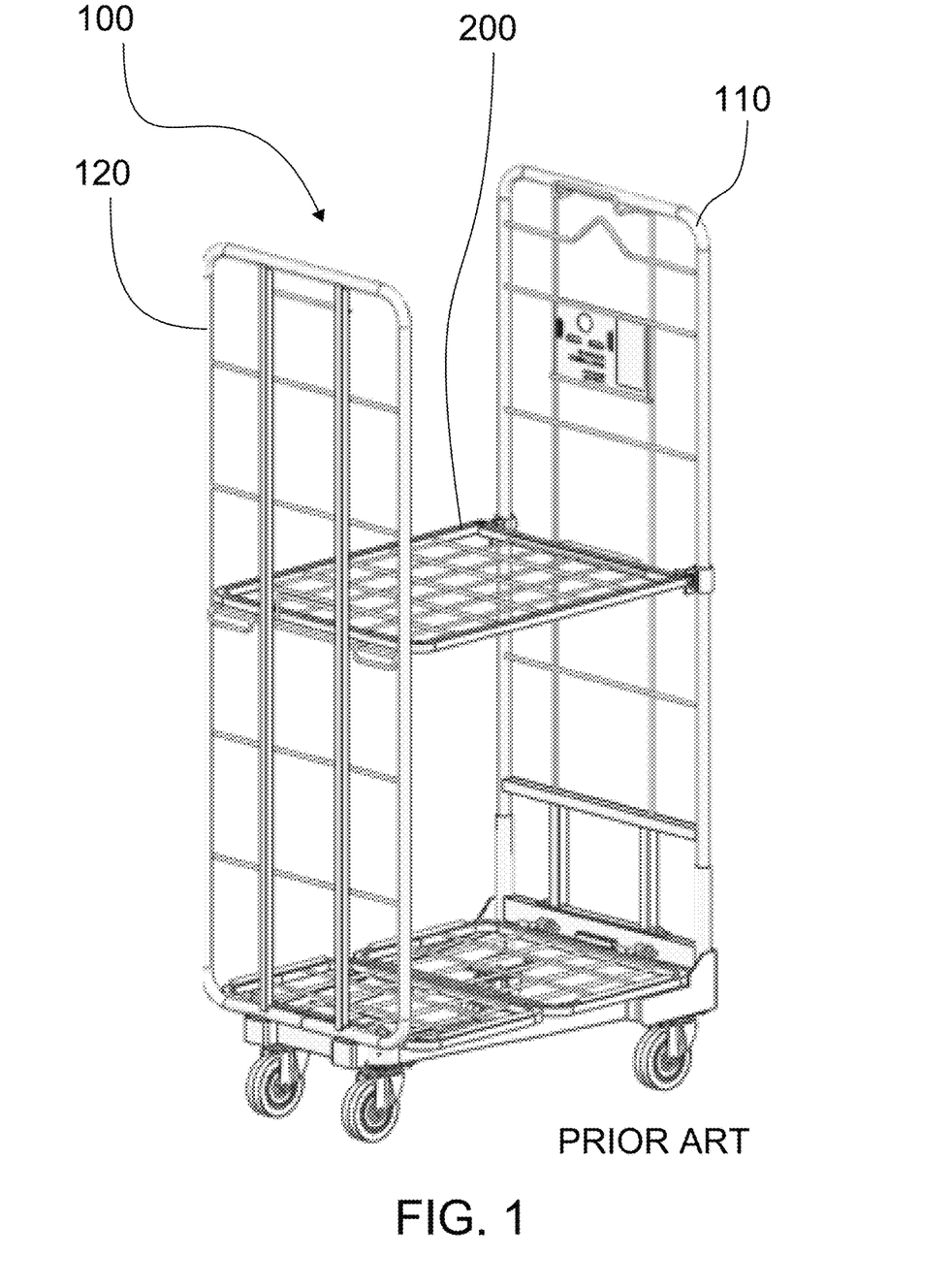
FIG. 1 presents an isometric view of a roll container having a shelf according to the prior art in a horizontal load carrying orientation.
Figure 2:
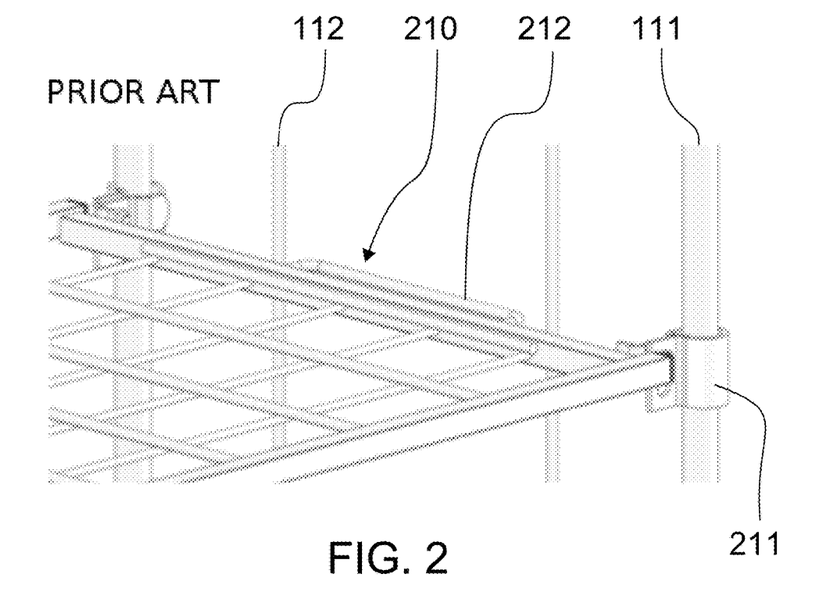
FIG. 2 presents a detail view of the pivoted end of the shelf of FIG. 1.
Figure 3:
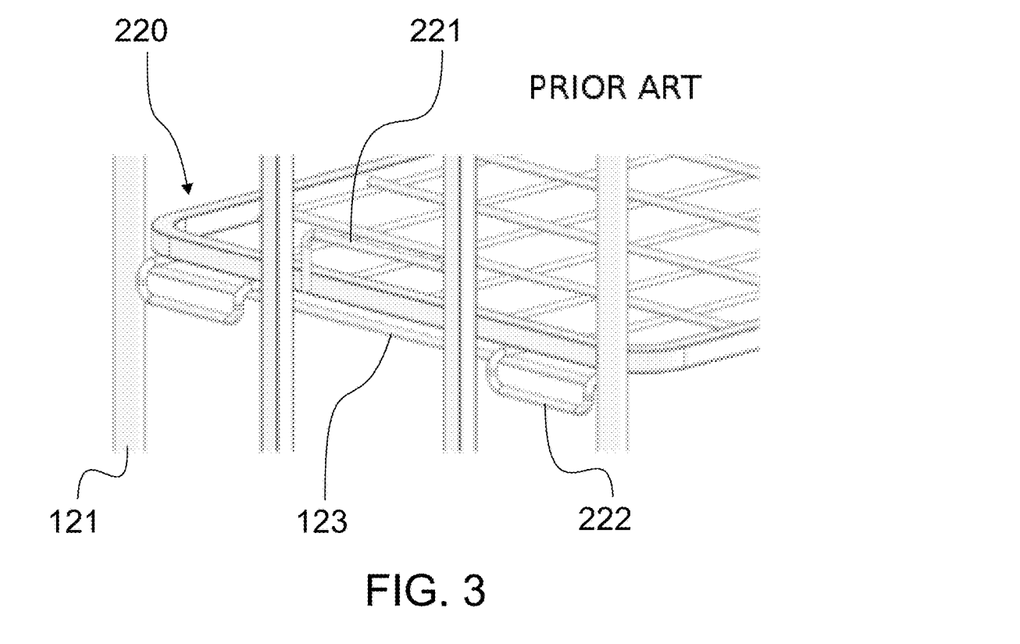
FIG. 3 presents a detail view of the terminal end of the shelf of FIG. 1.
Figure 4:
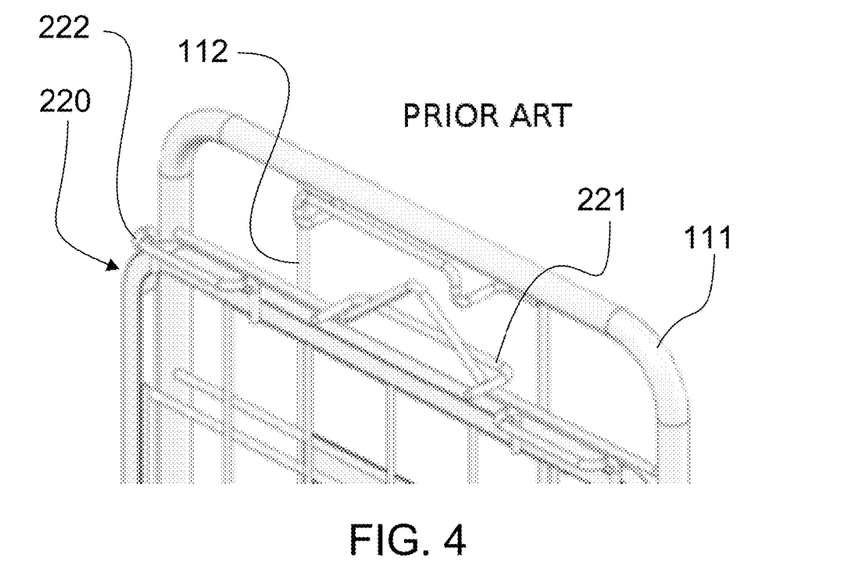
FIG. 4 presents a detail view of the terminal end of the shelf of FIG. 1 in a vertical folded orientation.
Figure 5:
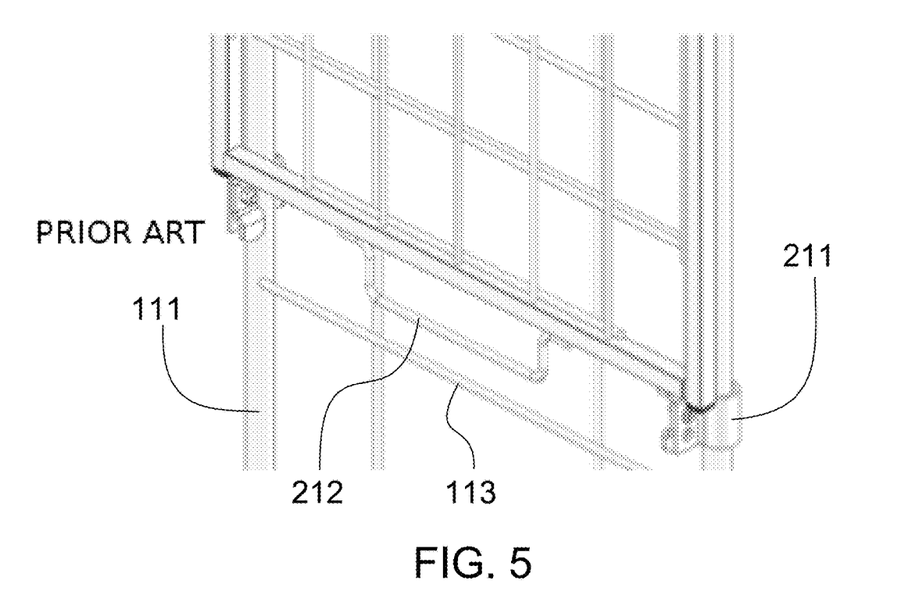
FIG. 5 presents a detail view of the pivoted end of the shelf of FIG. 1 in a vertical folded orientation.
Figure 6:
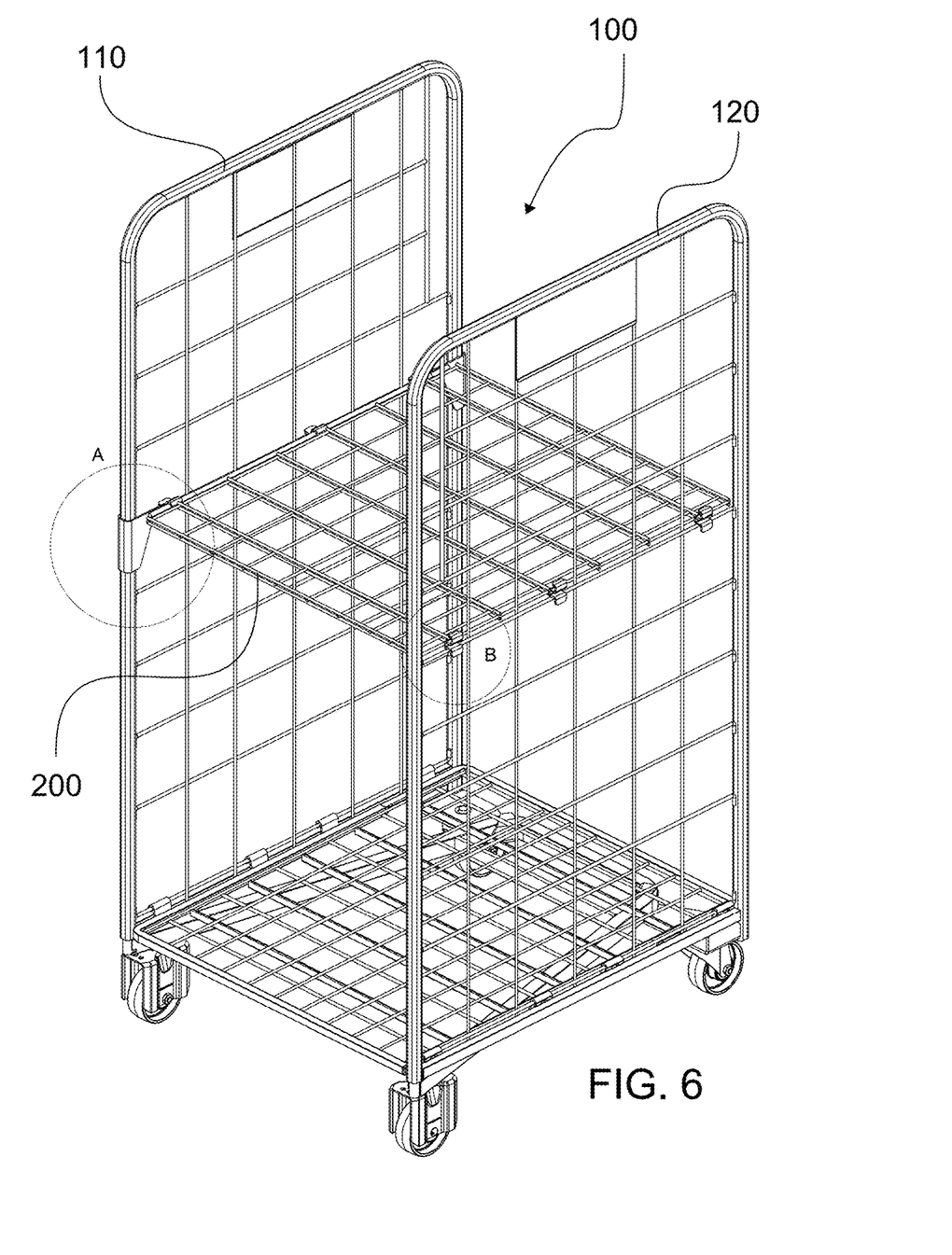
FIG. 6 presents an isometric view of a shelf according to one embodiment in a horizontal load carrying orientation.

A problem associated with known accessory shelves for roll containers is that they require the use of tools, e.g. in attaching the hinge (cf. FIGS. 2 and 5). Simple non-folding shelves are also known, but they are not ideal for the reasons that detachable become lost very easily as—instead of folding away—they must be stored somewhere.

It is therefore an aim of certain embodiments of the present invention to provide a folding accessory shelf for a roll container which may be readily retrofitted.

It is a particular aim to provide a folding accessory shelf for a roll container which may be retrofitted without the use of tools or modification of the roll container in any way.

SUMMARY

The aim is achieved with aid of a novel shelf for a roll container, a roll container including such a shelf and with a method of retrofitting such a shelf to a roll container.

According to the first aspect, the novel shelf includes a first end and a second end, which opposes the first end. The shelf also includes pivoting means, which is provided to the first end of the shelf for pivoting the shelf to a frame profile of a first wall of the roll container between a horizontal load carrying configuration and a vertical folding configuration. Included in the shelf is also locking means, which is provided to the second end of the shelf for resting the shelf in a load carrying orientation to a second wall of the roll container disposed at a distance from and opposing the first wall. The locking means is also configured to engage with a horizontal element of the first wall from suspending the shelf from the horizontal element of the first wall, when the shelf is in the vertical folding configuration. Furthermore, the pivoting means includes two slide members, which oppose each other at the first end of the shelf. The slide members are shaped to at least partly envelop a vertical section of a frame profile of the first wall of the roll container such so as to slide along corresponding opposing vertical sections of the frame profile of the first wall, whereby the shelf may be retrofitted to the roll container. Included in the pivoting means is also an axle, which is connected to at least one of said slide members to extend towards the other hinge member such to create an axis of revolution for the shelf. The pivoting means further includes a limiter, which is connected to the axle and set up to be rotated about said axis of revolution in respect to said at least one slide member and to engage with a horizontal element of the first wall for positioning the shelf vertically into the load carrying configuration.

According to another aspect, the novel roll container includes a first wall having a frame profile as well as horizontally and vertically extending elements. The roll container also includes a second wall, which opposes the first wall at a distance there from and which second wall has a frame profile as well as horizontally and vertically extending elements. The roll container further includes a shelf as described above.

According to a third aspect, in the novel method of retrofitting an above-described shelf to a roll container a shelf the slide members of the shelf are aligned with opposing vertical sections of a frame profile a first wall of the roll container. The shelf is slid into a desired height and the second end of the shelf is descended toward a horizontal position load carrying position. The shelf is locked into the horizontal load carrying position by setting the locking means of the shelf to rest against a horizontal element of a second wall of the roll container opposing the first wall, wherein the limiter at the first end of the shelf rests against a horizontal element of the first wall of the roll container.

Benefits

Considerable benefits are gained with aid of the present invention. By virtue of the slide members the shelf may be attached to the wall of the roll container simply by sliding the first end of the shelf along the frame profile. Accordingly, the installation requires no tools.

According to one embodiment, the free end of the shelf includes locking means for locking the shelf to the opposing second wall in the load carrying orientation. The locking means may be shaped to engage with a horizontal element, such as a mesh wire, of the first wall, whereby the retrofit shelf may be pivoted to a folding configuration without the need of modifying the roll container.

BRIEF DESCRIPTION OF DRAWINGS

In the following, exemplary embodiments of the invention are described in greater detail with reference to the accompanying drawings in which.

DETAILED DESCRIPTION OF EXEMPLARY EMBODIMENTS

As can be seen from FIGS. 6 to 11, the shelf 200 according to one embodiment is retrofitted between two walls of a roll container 100, namely the first and second wall 110, 120. The shelf 200 has two ends. The first end 210 is connected to the first wall 110 of the roll container 100 and acts as a pivoting point. The second end 220 is the free terminal end of the shelf 200 which is moved between the horizontal load carrying configuration (cf FIGS. 6 to 8) and vertical folded configuration (cf. FIGS. 9 to 11).

Figure 7:
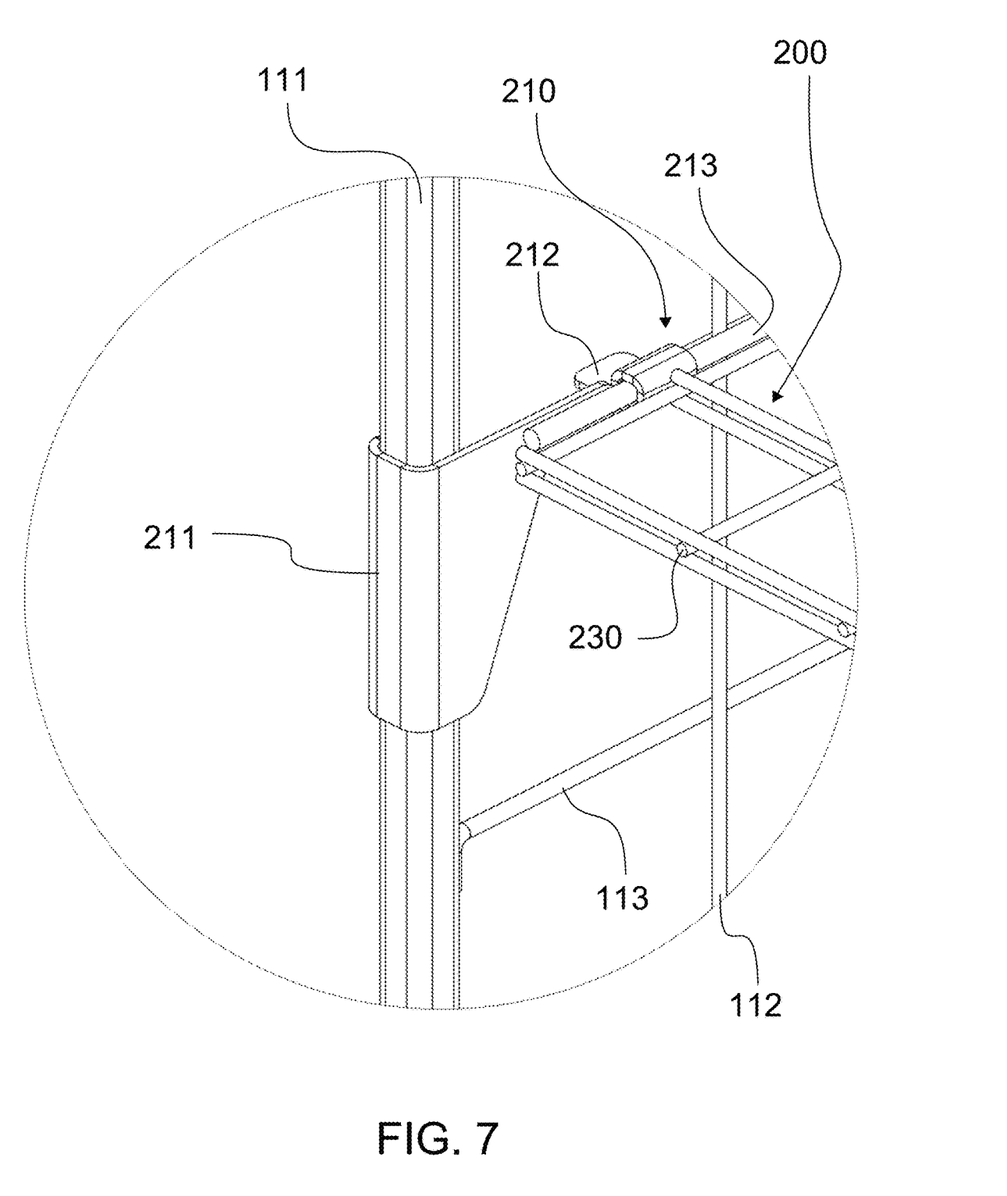
FIG. 7 presents a detail view of area A of FIG. 6.

Turning now to FIG. 7 which shows a detail view of the connection between the first end 210 of the shelf 200 and the first wall 110 of the roll container 100. The first end 210 includes two opposing slide members 211 provided to opposite lateral ends of the shelf 200. The slide members 211 are configured to slide along their respective vertical sections of the frame profile 111 of the first wall 110. The slide members 211 are shaped to envelop at least the outer portion of the frame profile 111 such that the slide member 211 is free to slide past horizontal wires 113 of the mesh. The illustrated example exhibits a cross-sectional shape substantially that of the letter C. The slide member 211 is further dimensioned such to provide a rotation fit between the slide member 211 and the frame profile 111.

Connected to the slide member 211 is an axle 213 which extends towards the other hinge member such to create an axis of revolution for the shelf 200. In the illustrated example the two slide members 211 are connected by one axle 213, but each slide member 211 could have its own axle which would extend towards the other slide member but terminate before joining the other slide member 211. A limiter 212 is arranged to the axle 213. In the shown example, there are three limiters 212 arranged along one axle 213 joining the two slide members 211. Should there be two axles (not shown), both axles would have their own limiters 212. The limiter 212 includes an enclosing portion, which encloses the axle 213, and a tab portion which extends from the enclosing portion. The tab portion is dimensioned to engage vertically with the horizontal wire 113 of the mesh or another horizontal element of the first wall 110 of the roll container 100. Instead of a horizontal wire 113 such a horizontal element could be a retrofitted stopper piece (not shown) which is provided between opposing vertical sections of the frame profile 110. Thus, the limiter 212 may engage with a horizontal element of the first wall 110 for locking the shelf 200 vertically into the load carrying configuration.

The limiter 212 is configured to be rotated about the axis of revolution of the shelf 200. According to the illustrated embodiment, the enclosing portion of the limiter 212 encloses the axle 213 in a rotatable manner such that there is a rotation fit between the enclosing portion and the axle 213. This rotation fit enables the limiter 212 to rotate in respect to the slide member 211 thus creating the axis of revolution of the shelf 200. In this embodiment, the axle 213 is fixed to the sliding member 211. When in the horizontal load carrying configuration (cf. FIG. 7), the tab portion of the limiter 212 rests against the horizontal wire 113 of the mesh of the first wall 110 thus positioning the shelf 200 vertically. When in the vertical folding configuration (cf. FIG. 11), the tab portion is detached through rotation from the wire 113.

According to an alternative embodiment (not shown), the axle is rotatably connected to the sliding portion, wherein the limiter is angularly fixed to the axle. In this embodiment, the rotation between the limiter and sliding member is provided with a sleeve (not shown) arranged to the sliding member, wherein the axle is attached to the sliding member via the sleeve with a rotation fit between the sleeve and axle.

Figure 8:
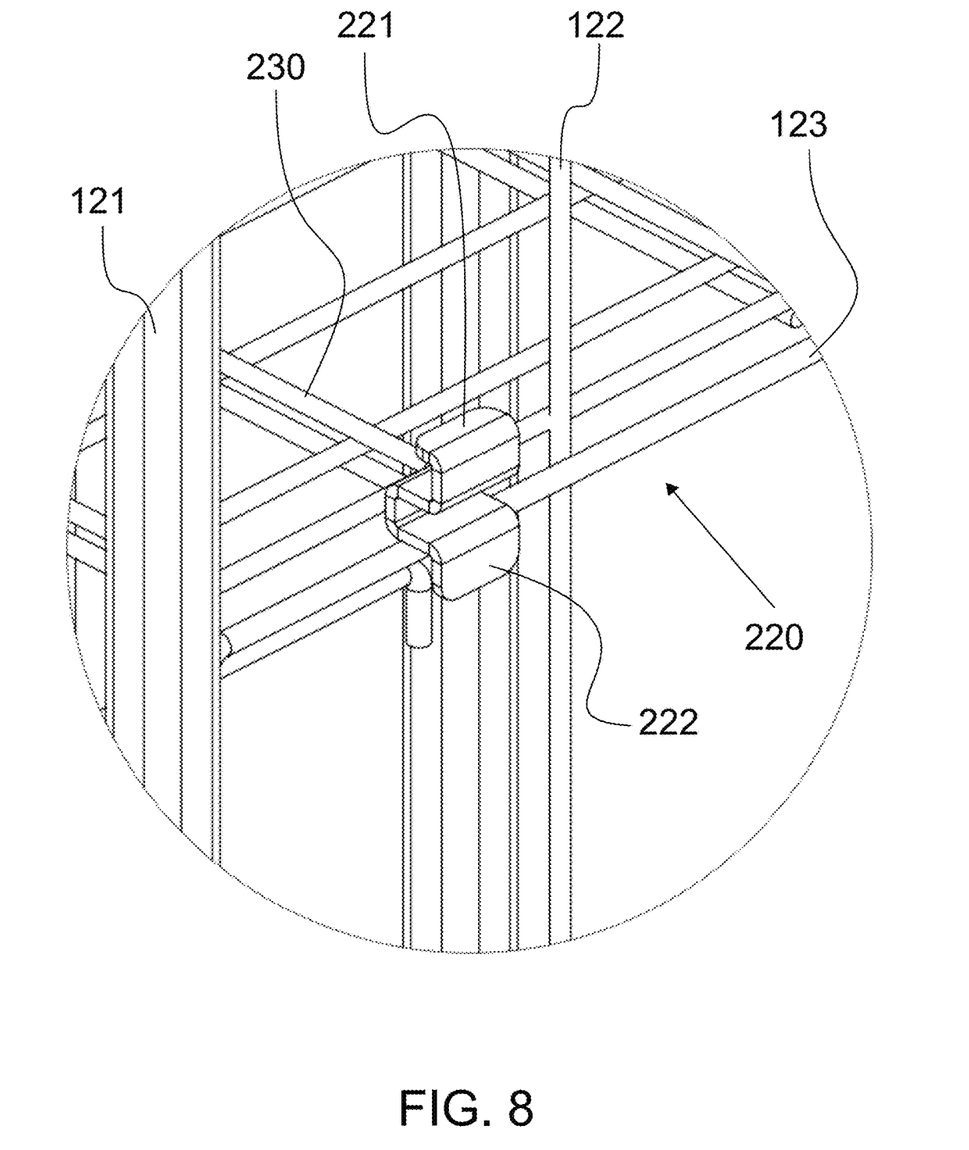
FIG. 8 presents a detail view of area B of FIG. 6.
Figure 9:
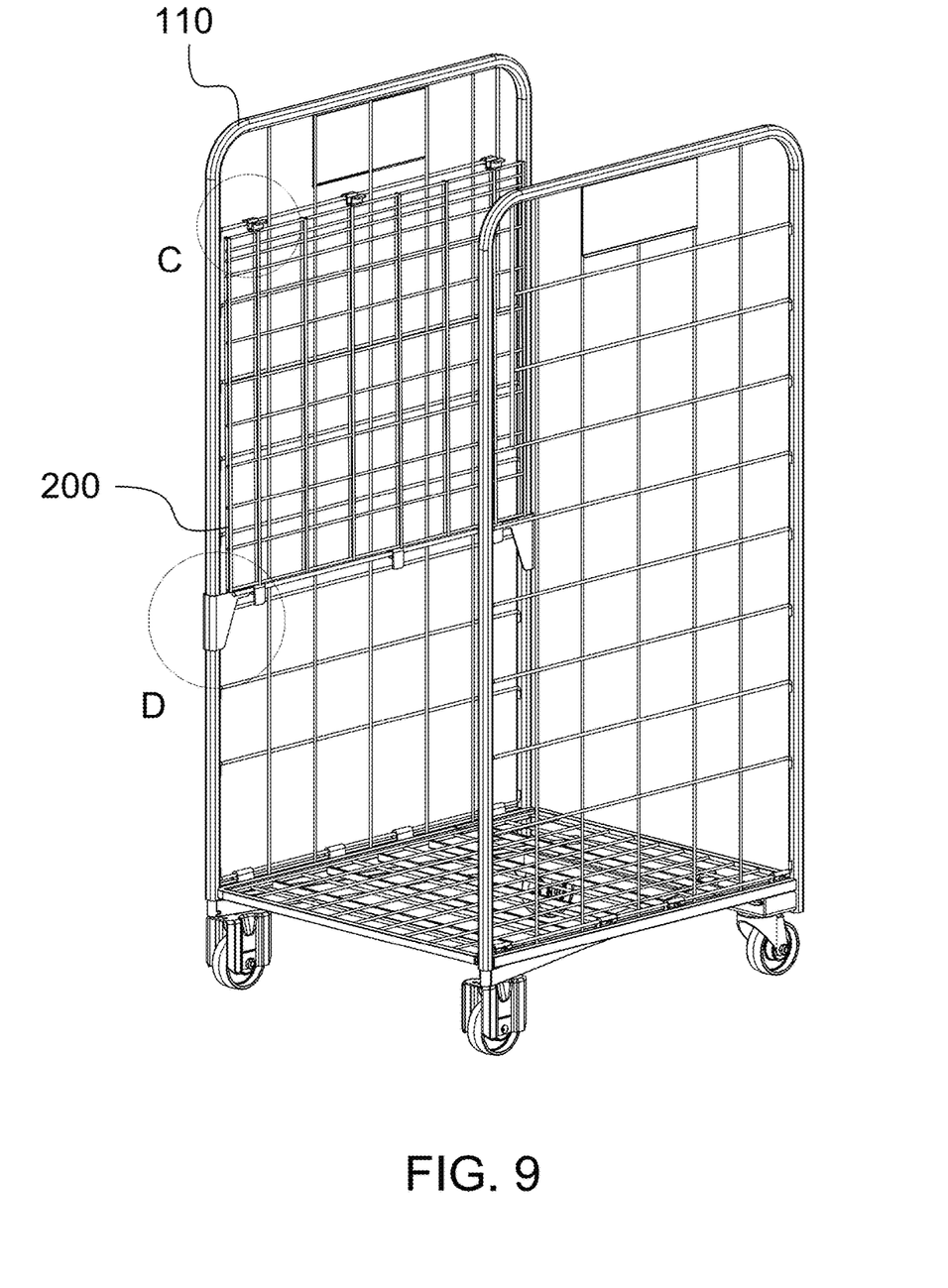
FIG. 9 presents an isometric view of the shelf of FIG. 6 in a vertical folded position.
Figure 10:
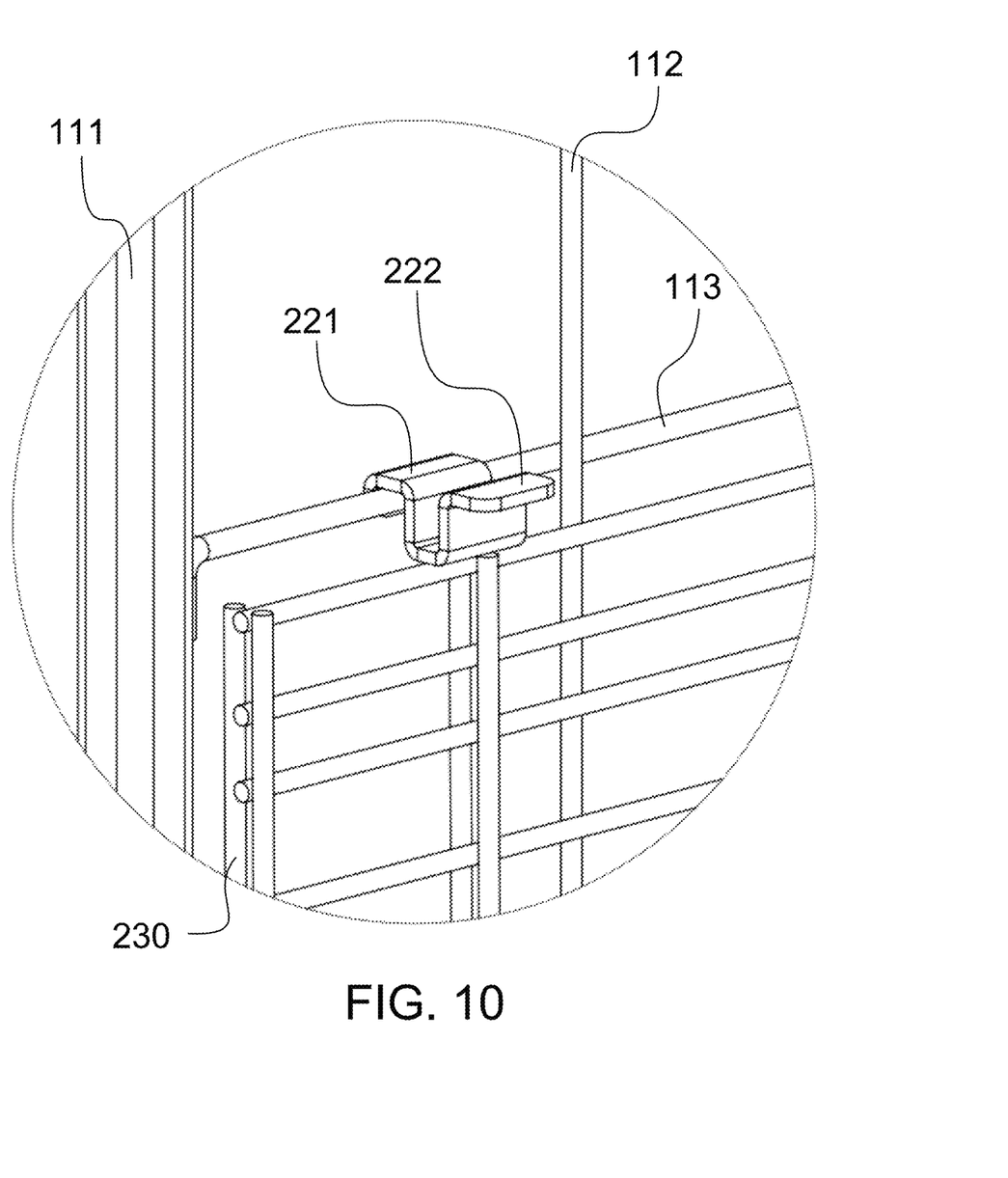
FIG. 10 presents a detail view of area C of FIG. 9.
Figure 11:
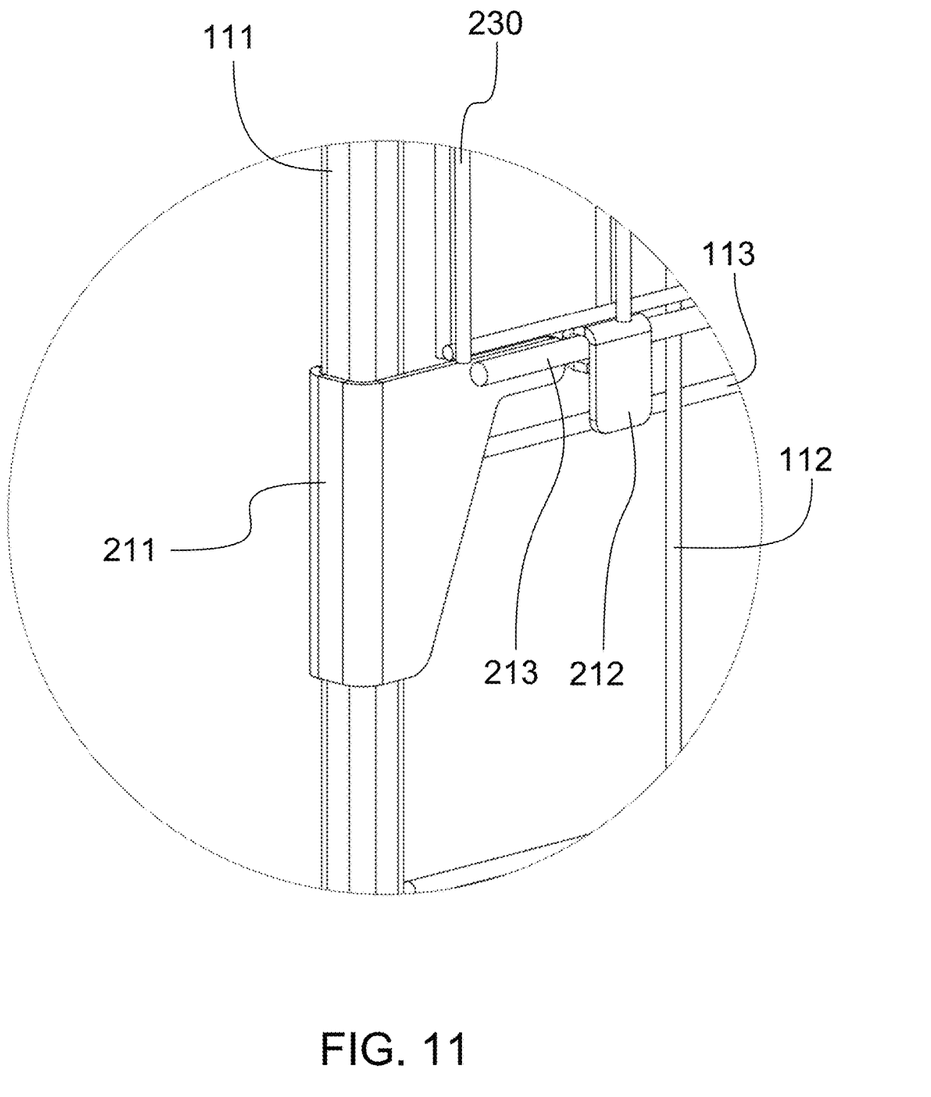
FIG. 11 presents a detail view of area D of FIG. 9.

Turning now to FIGS. 8 and 10 which show detailed views of the connection between the second end 210 of the shelf 200 and walls 110, 120 of the roll container 100. The second end 210 includes locking means 221, 222 for locking the shelf 200 on the one hand to the opposing second wall 120 in the load carrying orientation and on the other hand to the first wall 110 in the folding orientation. In particular, the locking means has a first protrusion 221 which is configured to engage with the horizontal wire 113 of the mesh or other horizontal element of the first wall 110, when the shelf 200 is in the folded configuration. The first protrusion 221 extends upward from a horizontal shelf 200 and is curved for enabling the shelf 200 to be suspended from the horizontal element of the first wall 100. In the illustrated example, the first protrusion 221 has a claw-like shape. The locking means also has a second protrusion 222 which extends to the opposite direction than the first protrusion 221. The second protrusion 222 is configured to engage with the horizontal wire 123 of the mesh or other horizontal element of the second wall 120 of the roll container, when the shelf 200 is in the load carrying configuration. The second protrusion 222 extends downward from a horizontal shelf 200 for enabling the shelf 200 to rest against the horizontal element of the first wall 100. In the illustrated example, the first protrusion 221 has a shape resembling the letter L. As may also be seen from the Figs., the locking means, i.e. the first and second protrusions 221, 222, are formed as one piece which is attached to the second end of the mesh 230 of the shelf, wherein the piece is simply shaped to exhibit protrusions to both directions normal to the plane of the mesh 230.

The shelf 200 as described above is retrofitted to a roll container 100 by aligning the slide members 211 with the opposing vertical sections, e.g. side tubes, of frame profile 110, of the first wall 110. The shelf 200 is slid into the desired height, where after the second end 220 of the shelf 200 is descended toward the horizontal position. The shelf 200 is locked into the horizontal load carrying position by setting the locking means, namely the second protrusion 222, to rest against a horizontal element, such as a wire 123 of the mesh, of the second wall 120. At the first end 210 of the shelf 200, the tab portion of the limiter 212 rests against the opposing horizontal element, e.g. a wire 113 of the mesh, of the first wall 110. The height of the shelf 200 may be adjusted by elevating the second end 220, sliding the slide members 211 to the desired direction and locking the height by bringing the locking means 222 of the second end 220 into contact with the corresponding horizontal element of the second wall 120. The shelf 200 is removed from the roll container 100 by performing the acts of installation in a reversed order.

The invention claimed is:

1. A shelf for a roll container, the shelf having a first end and a second end opposing the first end, the shelf comprising:
    a pivot member provided to the first end and capable of pivoting the shelf relative to a frame profile of a first wall of the roll container between a horizontal load carrying configuration and a vertical folding configuration;
    a locking mechanism associated with the second end of the shelf and disposed at a distance from and opposing the first wall, the locking mechanism capable of resting the shelf in a load carrying orientation to a second wall of the roll container, the locking mechanism configured to engage a horizontal element of the first wall to suspend the shelf from the horizontal element of the first wall when the shelf is in the vertical folding configuration; where
    the pivot member comprises:
        two slide members opposing each other at the first end of the shelf, the slide members shaped to at least partly envelop a vertical element of a frame profile of the first wall of the roll container to selectively slide along corresponding opposing vertical elements of the frame profile of the first wall, where the shelf may be retrofitted to the roll container;
        an axle connected to at least one of said slide members and extending towards the other slide member to create an axis of revolution for the shelf; and
        a limiter connected to the axle, the limiter comprising a tab portion extending in a direction away from the axle and configured to rotate about the axis of revolution in respect to said at least one slide member and to engage a horizontal element of the first wall for positioning the shelf vertically into the load carrying configuration.

2. The shelf according to claim 1, where the horizontal and vertical elements are horizontal and vertical wires of a mesh provided to the frame profile.

3. The shelf according to claim 2, where the limiter has an enclosing portion enclosing the axle and the tab portion extends from the enclosing portion.

4. The shelf according to claim 1, where the tab portion is dimensioned to engage vertically with the horizontal wire of the mesh of the first wall of the roll container.

5. The shelf according to claim 3, where the axle is rotationally enclosed by the enclosing portion.

6. The shelf according to claim 2, wherein the locking mechanism comprises a first protrusion configured to engage the horizontal wire of the mesh of the first wall when the shelf is in the folded configuration.

7. The shelf according to claim 6, where the locking mechanism comprises a second protrusion extending in the opposite direction than the first protrusion and configured to engage the horizontal wire of the mesh of the second wall when the shelf is in the load carrying configuration.

8. The shelf according to claim 1, where the slide member has a substantially C-shaped cross-section.

9. The shelf according to claim 1, where the limiter has an enclosing portion enclosing the axle and the tab portion extends from the enclosing portion.

10. The shelf according to claim 1, where the axle is rotatably connected to the slide member and the limiter is angularly fixed to the axle.

11. The shelf of claim 1 included in a roll container, the roll container comprising:
    a first wall having a frame profile and having horizontally and vertically extending elements; and
    a second wall spaced apart from and opposing the first wall, the second wall having a frame profile and having horizontally and vertically extending elements.

12. A method of retrofitting a shelf to a roll container, the shelf comprising a pivot mechanism capable of pivoting the shelf between a horizontal load carrying configuration and a vertical folding configuration, and a locking mechanism spaced apart from the first wall and configured to engage a horizontal element of the first wall to suspend the shelf from the horizontal element when the shelf is in the vertical folding configuration, the method comprising:
    aligning slide members of the pivot mechanism with opposing vertical elements of a frame profile of a first wall of the roll container, the slide members opposing each other at the first end of the shelf, the slide members shaped to at least partly envelop a vertical element of a frame profile of the first wall of the roll container,
    sliding the shelf into a desired height,
    lowering a second end of the shelf toward a horizontal position load carrying position, and
    locking the shelf into the horizontal load carrying position by positioning the locking mechanism to rest against a horizontal element of a second wall of the roll container opposed to the first wall, where a limiter at the first end of the shelf has a tab portion that rests against a horizontal element of the first wall of the roll container, the limiter connected to an axle creating an axis of revolution of the shelf, the tab portion extending in a direction away from the axle and the limiter configured to rotate about the axis of revolution in respect to said at least one slide member and to engage a horizontal element of the first wall for positioning the shelf vertically into the load carrying configuration.

13. The method according to claim 12, where the horizontally and vertically extending elements are horizontal and vertical wires of a mesh provided to the frame profile.

14. The method according to claim 13, where the limiter has an enclosing portion enclosing the axle and the tab portion extends from the enclosing portion.

15. The method according to claim 12, where the tab portion is dimensioned to engage vertically with the horizontal wire of the mesh of the first wall of the roll container.

16. The method according to claim 13, where the locking mechanism comprises a first protrusion configured to engage the horizontal wire of the mesh of the first wall when the shelf is in the folded configuration.

17. The method according to claim 16, where the locking mechanism comprises a second protrusion extending in the opposite direction than the first protrusion and configured to engage the horizontal wire of the mesh of the second wall when the shelf is in the load carrying configuration.

18. The method according to claim 12, where the slide member has a substantially C-shaped cross-section.

19. The method according to claim 12, where the limiter has an enclosing portion enclosing the axle and the tab portion extends from the enclosing portion.

20. The shelf according to claim 12, where the axle is rotatably connected to the slide member and the limiter is angularly fixed to the axle.

* * * * *